Dec. 3, 1929.   G. WEBB ET AL   1,737,693
DISH WASHING MACHINE
Filed July 6, 1926   3 Sheets-Sheet 3
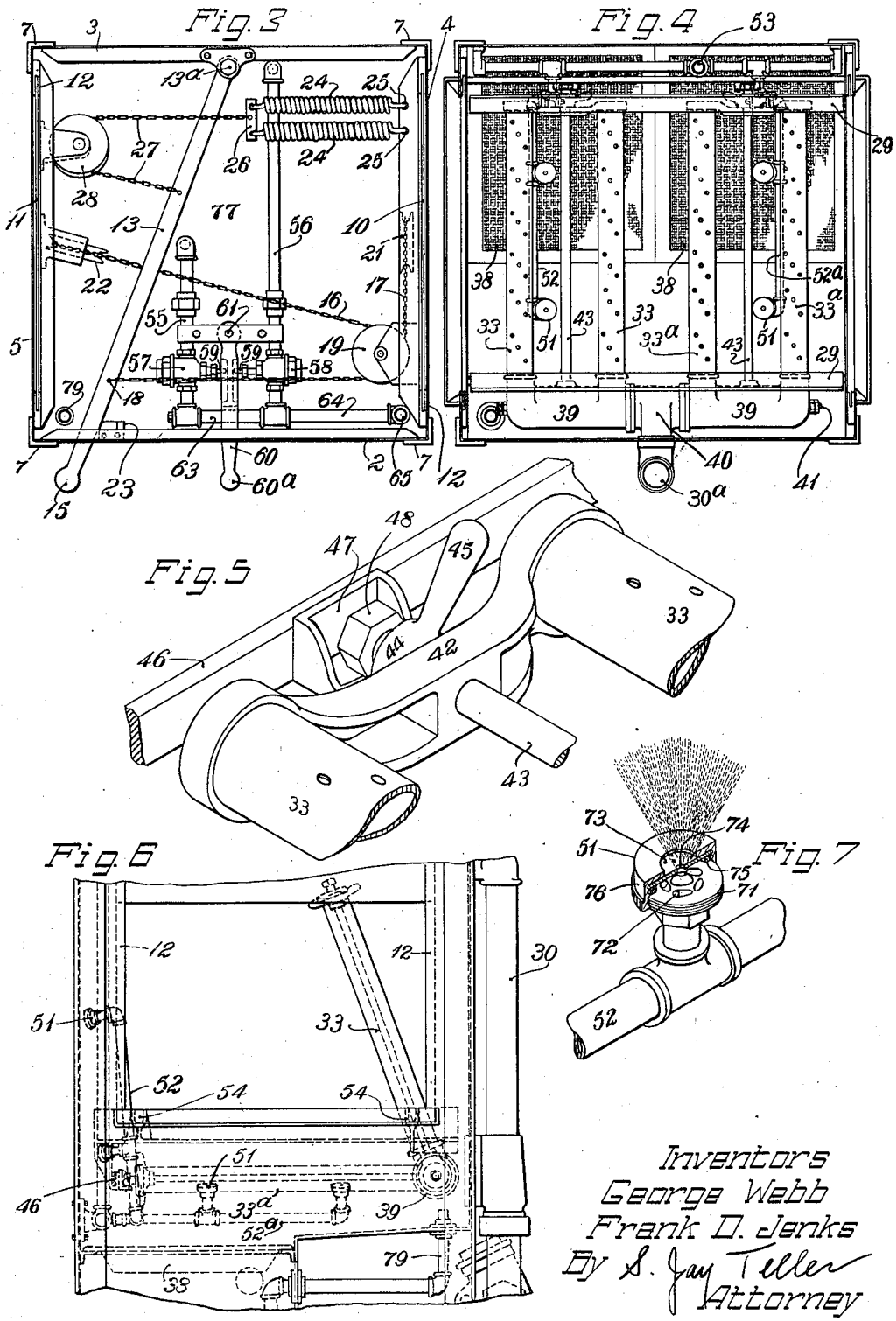
Inventors
George Webb
Frank D. Jenks
By S. Jay Teller
Attorney Patented Dec. 3, 1929

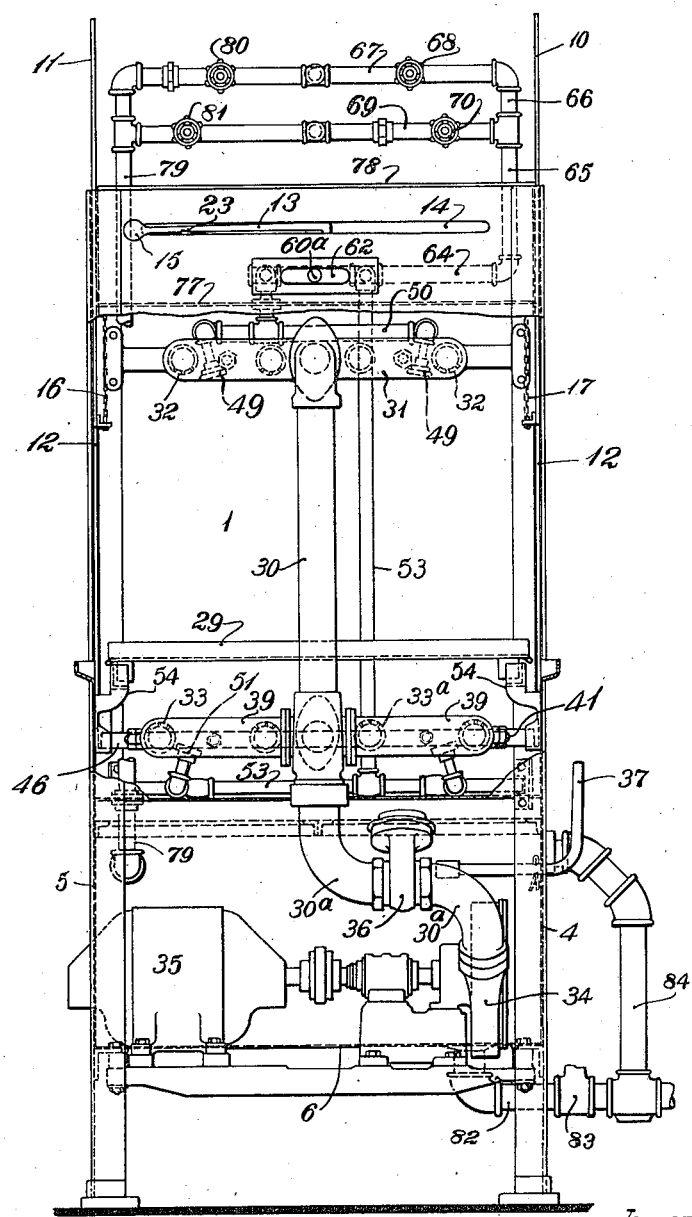

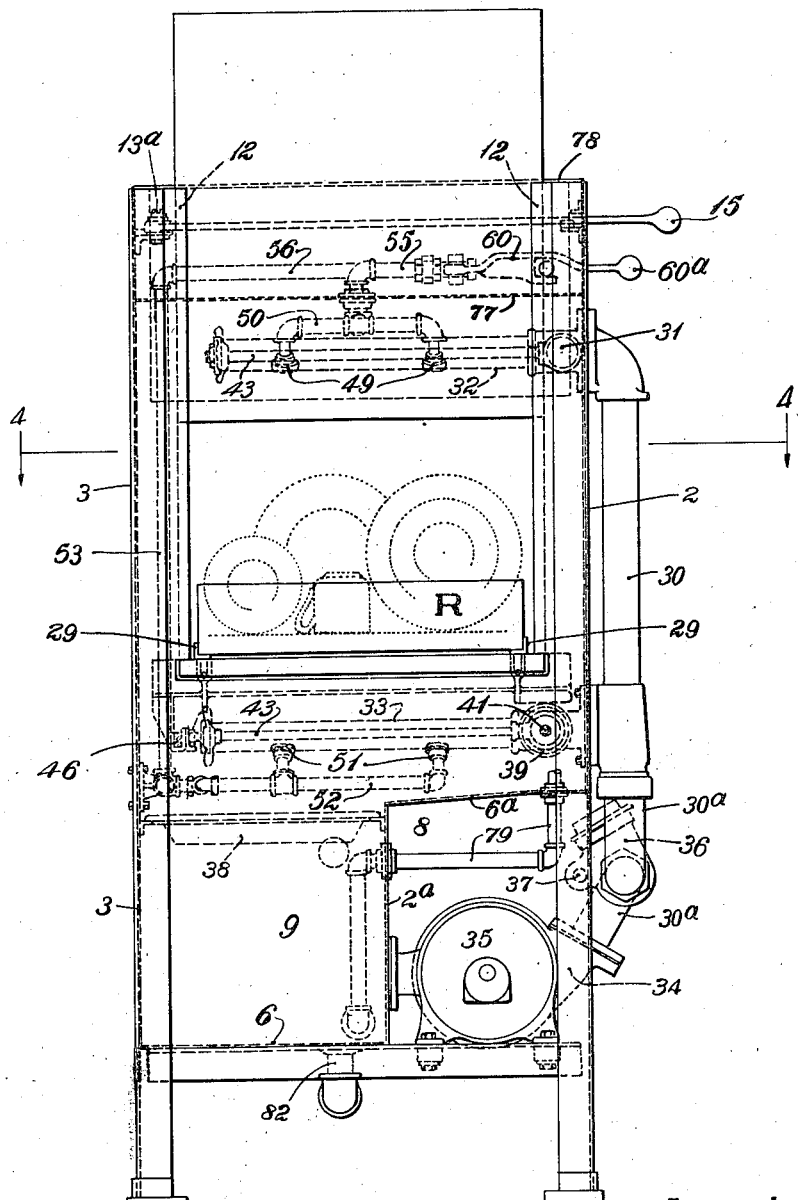

1,737,693

UNITED STATES PATENT OFFICE

GEORGE WEBB, OF WEST HARTFORD, AND FRANK D. JENKS, OF HARTFORD, CONNECTICUT, ASSIGNORS TO COLT'S PATENT FIRE ARMS MANUFACTURING COMPANY, OF HARTFORD, CONNECTICUT, A CORPORATION OF CONNECTICUT

DISH-WASHING MACHINE

Application filed July 6, 1926. Serial No. 120,710.

The invention relates particularly to dish washing machines of the type wherein dishes to be washed are introduced into a casing and held in a stationary position while being treated or acted upon by washing liquids.

The general object of the invention is to provide a washing machine of the type specified which is simple in construction and convenient in operation and which has its various parts so located and arranged as to be readily adapted for cleaning.

A more specific object of the invention is to provide an improved construction and arrangement of the several spray devices, particularly the lower spray devices, so that they can be readily moved to give access to the liquid tank and the screen in the lower part of the casing.

Still other specific objects of the invention will be apparent from the following specification and claims.

In the accompanying drawings have shown the embodiment of the invention which we now deem preferable, but it will be understood that the drawings are intended merely for purposes of illustration and are not to be considered as defining or limiting the scope of the invention, the claims forming a part of this specification being relied upon for that purpose.

Of the drawings:

Fig. 1 is a front view of a washing machine embodying the invention, a portion of the front wall of the casing being broken away to show interior parts.

Fig. 2 is a left side view of the machine shown in Fig. 1.

Fig. 3 is a top view of the machine with the top cover removed.

Fig. 4 is a horizontal sectional view taken along the line 4—4 of Fig. 2.

Fig. 5 is an enlarged fragmentary perspective view showing certain details of construction of one of the lower main spray devices.

Fig. 6 is a fragmentary left side view similar to Fig. 2, showing the left-hand lower spray devices in the positions to which they are moved in order to give access to the left-hand screen.

Fig. 7 is a perspective view partly in section showing in detail one of the final rinsing spray nozzles.

Referring to the drawings, 1 represents as an entirety the main casing of the machine, this casing preferably being rectangular in form. The front and rear walls of the casing are indicated respectively by 2 and 3 and the right and left side walls are indicated respectively by 4 and 5. The bottom wall of the casing is shown at 6. The casing is carried by a suitable frame work and as shown this frame work comprises angle irons 7, 7 at the respective corners of the casing. These angle irons are extended downward to form floor engaging legs which support the casing at some distance above the floor.

Preferably and as shown the casing is recessed or cut away, preferably adjacent the front, to form a space 8 within the main outlines of the casing. This space is separated from the main body of the casing by an auxiliary front wall 2$^a$ and by an auxiliary bottom wall 6$^a$. The space 9 inside of the casing and at the lower portion thereof between the rear wall 3 and the auxiliary front wall 2$^a$ constitutes a reservoir for washing liquids. The space 8 in front of the wall 2$^a$ and below the wall 6$^a$ is utilized for containing the motor and pump as will presently appear.

In order that dishes to be washed may be introduced into the casing, one of the side walls is provided with a large opening and a door is provided whereby this opening may be closed during the washing operation. Preferably in order that the dishes may be placed in the machine at one side and removed therefrom at the other side, both of the side walls 4 and 5 are provided with openings, and two similar doors 10 and 11 are provided for closing these openings. The doors 10 and 11 are preferably mounted so as to slide vertically and when so mounted each of the side walls carries guides 12, 12 which engage the doors and control the vertical sliding movements thereof.

For operating the doors a suitable manually operable mechanism is provided, and we prefer to provide a mechanism which is constructed and arranged as shown in our copending application, for dish washing machines, Serial No. 62,857, filed October 16, 1925, of which this present application is a continuation in part. When two doors are provided as shown we provide a door opening and closing mechanism having its major portions behind the front wall of the casing but including an operating lever which extends in front of the front wall so as to be conveniently accessible for manual operation. In order to protect the said mechanism from the action of the spray devices there is preferably provided a partition within the casing which forms a separate chamber for the mechanism.

Preferably the door opening and closing mechanism is located at the top of the casing above the spray devices, and when it is so located all of the principal parts thereof are movable horizontally and the partition, when provided, is a horizontal one forming a transverse chamber at the top of the casing. As illustrated, this mechanism preferably comprises a lever 13 which is pivoted at $13^a$ to the back wall 3 of the casing so as to be capable of transverse horizontal movement. The lever 13 at its front end projects through a slot 14 in the front wall of the casing and is provided with a handle or knob 15 whereby it may be manually moved. The lever 13 is connected with the respective doors by means of flexible tension elements 16 and 17, which elements may be chains or cables as preferred. The two chains or cables 16 and 17 are both connected to the lever 13 at 18 and they extend over two coaxial pulleys at 19 (only the top pulley being shown). From the pulleys 19 the chains or cables extend in different directions and pass respectively over pulleys 21 and 22. From the pulleys 21 and 22 chains or cables extend vertically downward and are attached to the respective doors near the bottoms thereof. From the foregoing description it will be understood that when the lever 13 is moved toward the left the doors will be raised and that when the lever 13 is moved toward the right the doors will be lowered. Preferably a lug 23 is provided adjacent the slot 14 so as to automatically engage the lever 13 and hold it in the left-hand position corresponding to the open positions of the doors. By raising the lever slightly it can be disengaged from the lug 23 to permit movement toward the right.

Preferably one or more springs are provided to partly counter-balance the weights of the doors so as to facilitate the raising thereof. As shown and as preferred the spring or springs are associated with the lever 13 so as to be connected with the doors indirectly by means of the said lever and by means of the said chains or cables 16 and 17. As shown, there are two tension coil springs 24, 24 which are connected at their right-hand ends to the casing at 25, 25. At their left-hand ends the springs are connected with a yoke 26 and this yoke is connected to the lever 13 by means f a chain or cable 27 which passes around a pulley 28. It will be seen that the tension of the spring tends to move the lever 13 in the left-hand direction thus tending to raise the doors.

It will be observed by referring particularly to Figure 3 that the springs 24 are so connected to the lever 13 through the chain 27 that, when the lever is in the right-hand door closing position, the said springs being then extended will have their ends at opposite sides of the said lever. This construction enables us to provide much longer springs than would be possible if the springs were connected directly to the lever.

Suitable devices are provided inside of the casing for supporting the dishes to be washed, these devices being in register with the doors. Preferably the dishes are placed in trays or racks such as shown at R in Fig. 2, and when such racks are provided the supporting devices take the form of rails 29, 29. It will be seen that when the doors are opened a tray of dishes to be washed can be inserted at one side, for instance, the right-hand side, and a tray of washed dishes can at the same time be pushed out of the door at the opposite side, that is, at the left-hand side. Ordinarily suitable tables (not shown) are provided for holding the dishes or trays before and after passing through the machine.

Main spray devices are provided for delivering washing liquid forcibly against the dishes supported by the supporting devices. Ordinarily there are two separate sets of main spray devices, one being located below the dishes and the other above the dishes. As shown, there is a main supply pipe 30 which extends vertically and which is preferably located at the front of the machine. A manifold 31 is located inside of the casing near the top and is connected with the supply pipe 30. A plurality of horizontal spray pipes 32, 32 are connected with the manifold and extend horizontally across the casing above the space occupied by the dishes. The pipes 32, 32 are provided with slots or holes in their bottom portions through which the washing liquid is delivered downward against the dishes. Another set of main spray devices is located below the dishes and comprises spray pipes 33, 33 and $33^a$, $33^a$, preferably four in number, having spray apertures in their upper portions through which the washing liquid is delivered upward against the dishes.

The liquid delivered by the spray pipes described passes downward into the reservoir 9 and is returned to the several spray pipes by means of a pump 34 driven by a suitable motor, such as an electric motor 35. The pump and the motor are preferably located in the before-mentioned space 8 which is provided for the purpose. The pump is connected with the upright supply pipe 30 by means of piping 30ᵃ, and included in this piping is a valve 36 adapted to be opened and closed manually by means of a handle 37, preferably located at the right-hand side of the machine. Inasmuch as the pump 34 is a centrifugal one, the flow of liquid to the spray devices can be stopped by closing the valve 36, the pump 34 continuing to operate.

Screens are provided at the top of the reservoir 9 to prevent particles of food and other refuse from passing downward into the reservoir and being thence returned to the spray devices and to the dishes. Preferably there are two separate screens 38, 38 located at the respective sides of the machine. Either one of these screens can be removed independently of the other for the purpose of cleaning the said screen or for the purpose of providing access to the reservoir.

It will be observed that the spray pipes 33, 33 and 33ᵃ, 33ᵃ are immediately above the screen and it will therefore be apparent that these spray pipes must be moved in order to permit the convenient removal of the screens. Preferably and in accordance with the invention the pairs of spray pipes at the respective sides of the machine are independently pivoted so that either of the said pairs of pipes can be raised independently of the other pair of pipes to permit access to the corresponding screen. As shown, the two pairs of spray pipes 33, 33 and 33ᵃ, 33ᵃ are connected respectively to separate manifolds 39, 39 which are pivoted for movement about a horizontal axis adjacent the front wall of the casing. For supplying water to the manifolds 39, 39 a T-connection 40 is provided which serves both manifolds and which also serves as the pivotal mounting therefor. It will be observed that the two manifolds 39, 39 are held in assembled relation with the T-connection 40 by means of a tie rod 41. By reason of this construction it is possible to raise the spray devices at either side of the machine, as shown, for instance, in Fig. 6, so as to permit access to the corresponding screen 38.

Preferably each spray pipe 32, 32 or 33, 33 or 33ᵃ, 33ᵃ is seated in a shouldered aperture in the corresponding manifold and the two pipes constituting each pair are held in place by a yoke 42 and a tie rod 43 as shown in detail in Fig. 5. By means of a nut 44 provided with a handle 45, the yoke 42 can be forced against the rear or outer ends of the pipes to hold them in place. By removing or freeing the nut 44, the two pipes can be easily removed for cleaning. In the case of the lower pivoted pipes 33, 33 or 33ᵃ, 33ᵃ the tie rod 43 is utilized for supporting the pipes in horizontal position. As shown, there is a transverse bar 46 which carries a bracket 47 in position to engage a nut or head 48 on the tie rod 43. It will be understood that the bar 46 carries two brackets 47 so as to support both pairs of pipes 33, 33 and 33ᵃ, 33ᵃ. The bar 46 is removably supported in suitable brackets at the ends thereof.

In addition to the main spray devices which have been described in detail, there are also preferably provided auxiliary rinsing spray devices located above and below the space occupied by the dishes. As preferred and as shown, these auxiliary rinsing spray devices consist of nozzles connected with suitable pipes. There are four nozzles 49, 49 located adjacent the pipes 31, 31 and arranged in pairs at both sides of the center of the machine. These nozzles are carried by piping 50. Similarly, there are preferably four nozzles 51, 51, located below the dishes and adjacent the pipes 33, 33 and 33ᵃ, 33ᵃ. There are two nozzles at each side of the center of the machines, the respective pairs of nozzles being carried by pipes 52 and 52ᵃ.

As shown most clearly in Figs. 4 and 6 each of the pipes 52 and 52ᵃ is pivotally mounted at the back of the machine so as to be capable of being raised and lowered about a transverse horizontal axis. The two pipes 52 and 52ᵃ are connected with supply piping 53. It will be observed that the pivotal mounting of the pipes 52 and 52ᵃ and the nozzles carried thereby permits the nozzles at either side of the machine to be swung upward as shown in Fig. 6 to provide access to the corresponding screen 38.

In obtaining access to one of the screens the first step is to raise the corresponding pipes 33, 33 or 33ᵃ, 33ᵃ toward the front and to then raise the corresponding pipe 52 or 52ᵃ toward the rear as shown in Fig. 6. Preferably in order that there may be no interference with the rails 29, 29 which support the dish tray these rails are made removable being carried at their ends by means of brackets 54, 54.

The several rinsing spray devices described are supplied with fresh liquid, ordinarily hot water, and the piping leading to the beforementioned supply piping 50 and 53 is located in the upper part of the casing immediately adjacent and preferably below the door operating mechanism. There is a horizontal pipe 55 which connects with the piping 50 and a horizontal pipe 56 which connects with the piping 53. The pipes 55 and 56 are connected respectively with valves 57 and 58 which are normally closed but which are provided with horizontally extending stems 59, 59 whereby they may be opened. These two stems project toward each other and are in position to be engaged by a horizontally movable lever 60. The lever 60 has a vertical pivotal mounting at 61 and it projects through a horizontal slot 62 in the front wall of the casing immediately below the slot 14 for the door operating lever. At the front end of the lever 60 is a handle or knob 60ᵃ whereby the lever may be manually operated. Hot water is supplied to the valves 57 and 58 by means of pipes 63, 64, 65, 66 and 67. A valve 68 is provided in the pipe 67 for regulating the supply. It will be apparent that when the lever 60 is in its central position as shown, both of the valves 57 and 58 will be closed. However, by moving the lever 60 toward the left, water may be admitted to the upper spray nozzles and by moving the lever 60 toward the right water may be admitted to the lower spray nozzles. Thus the operator, by means of the single horizontally movable lever 60 can entirely control and regulate the action of the upper and lower nozzles.

In order that steam may be admitted, either for the purpose of heating the water or for the purpose of being mixed with the water for spraying, a steam supply pipe 69 provided with a valve 70 is included. By regulating the valve 70 the amount of steam introduced into the rinsing water may be varied.

Each of the nozzles 49, 49 or 51, 51 is constructed as shown in detail in Fig. 7, the construction being such as to provide a conical spray having the liquid uniformly distributed throughout the conical space. This is in contrast with sprays heretofore used for this purpose wherein conical sprays have been provided with the liquid moving entirely along the surface of the cone instead of being uniformly distributed therethrough. This uniform distribution of the sprays is obtained by using a nozzle of the type illustrated. The nozzle comprises a body portion 71 having a plurality of holes 72 therein all of which communicate with the supply pipe on which the nozzle is carried. These holes 72 are inclined with respect to the top surface of the nozzle body and are also tangent to a cylindrical surface concentric with the axis of the nozzle. A disk 73 is provided having a central hole 74 therein, and this disk is spaced from the top surface of the nozzle body by means of a spacing ring 75. A threaded cap member 76 holds the disk 73 and the ring 75 in place. By reason of the inclined tangential location of the holes 72 and by reason of the location of the central hole 74, the liquid is caused to form a conical spray body having the liquid uniformly distributed therethrough as already described.

As already stated the door operating mechanism and the valve mechanism for the auxiliary spray devices are located at the top of the casing. Preferably in order that these parts may be protected from the action of the spray devices a partition 77 is provided which entirely separates these parts from the spray devices and forms a separate chamber at the top of the casing for containing them. A cover 78 may be provided, if desired, for the top of the casing and this cover forms a closure for the before-mentioned chamber.

Preferably a branch pipe 79 extends vertically and terminates in the reservoir 9. This pipe is connected with the hot water and steam supply mains, the connection being regulated respectively by means of valves 80 and 81. When the valve 80 is opened, additional water may be admitted to the reservoir 9 and when the valve 81 is opened steam may be admitted to the reservoir for purposes of raising the temperature of the liquid therein.

A drain pipe 82 is provided for the discharge of liquid from the reservoir 9, the discharge being controlled by a valve 83. There is also an overflow pipe 84 communicating with the pipe 82 this pipe serving to prevent the liquid in the reservoir from rising above a predetermined level.

What we claim is:

1. In a washing machine for dishes or similar articles, the combination of a main casing having supply and discharge openings at opposite sides thereof, means in the casing in register with the said openings for supporting dishes to be washed, liquid spray devices in the casing below the supporting means, other liquid spray devices in the casing above the supporting means, supply pipes connected to some of the spray devices and located in part inside of the casing and at the top thereof, valve mechanism for the said supply pipes also located inside of the casing and at the top thereof, the said valve mechanism including an operating handle extending through a slot in the front wall of the casing, doors for normally closing the respective openings in the casing, and a door operating mechanism having portions thereof located inside the casing closely adjacent the said supply pipes and valve mechanism, the said door operating mechanism including an operating handle extending through another slot in the front wall of the casing.

2. In a washing machine for dishes or similar articles, the combination of a main casing having an opening at one side for the admission of dishes to be washed, means in the casing in register with the opening for supporting the dishes, a removable horizontal screen located in the casing below the position of the dishes supported on the said supporting means, a reservoir positioned to receive washing liquid passing through the screen, a main spray device normally located above the screen and below the position of the dishes, the said device being pivotally connected with the casing for upward movement about a horizontal axis at one side, and an auxiliary spray device also normally located above the screen and below the position of the dishes, the said device being pivotally connected with the casing for upward movement about a horizontal axis at the side of the casing opposite the first said axis, the two said spray devices being adapted to be swung upward in opposite directions about their respective axes to provide access to the said screen.

3. In a washing machine for dishes or similar articles, the combination of a main casing having supply and discharge openings at opposite sides thereof, a removable horizontal screen in the lower part of the casing, a reservoir positioned to receive washing liquid passing through the screen, a main spray device located above the screen and pivotally connected with the casing for upward movement about a horizontal axis at one side, an auxiliary spray device also normally located above the screen and pivotally connected with the casing for upward movement about a horizontal axis at the side of the casing opposite the first said axis, the two said spray devices being adapted to be swung upward in opposite directions about their respective axes to provide access to the said screen, and two horizontal cross rails in the casing in alignment with the openings therein and adapted to support a tray of dishes to be washed, the said rails being removable to permit upward movement of the said spray devices as aforesaid.

4. In a washing machine for dishes or similar articles, the combination of a main casing having an opening at one side for the admission of dishes to be washed, two similar removable horizontal screens in the casing below the position of the dishes supported on the said supporting means, a reservoir positioned to receive washing liquid passing through the screens, and two similar main spray devices normally located above the respective screens and below the position of the dishes, the said devices being separately mounted for independent upward pivotal movement about a horizontal axis at one side of the casing so that either of them may be raised independently of the other to provide access to the corresponding screen.

5. In a washing machine for dishes or similar articles, the combination of a main casing having an opening at one side for the admission of dishes to be washed, two similar removable horizontal screens in the casing below the position of the dishes supported on the said supporting means, a reservoir positioned to receive washing liquid passing through the screens, two similar main spray devices normally located above the respective screens and below the position of the dishes, the said devices being separately mounted for independent upward pivotal movement about a horizontal axis at one side of the casing so that either of them may be raised independently of the other to provide access to the corresponding screen, and a common supply pipe connected with both of the said spray devices and located between them.

6. In a washing machine for dishes or similar articles, the combination of a main casing having an opening at one side for the admission of dishes to be washed, two similar removable horizontal screens in the casing below the position of the dishes supported on the said supporting means, a reservoir positioned to receive washing liquid passing through the screens, two similar main spray devices normally located above the respective screens and below the position of the dishes, the said devices being separately mounted for independent upward pivotal movement about a horizontal axis at one side of the casing so that either of them may be raised independently of the other to provide access to the corresponding screen, and a removable horizontal bar for supporting the free ends of the said devices.

GEORGE WEBB.
FRANK D. JENKS.